(12) United States Patent
Kung et al.

(10) Patent No.: US 7,777,810 B2
(45) Date of Patent: Aug. 17, 2010

(54) ROTATABLE CAMERA CONTROLLED BY A SINGLE MOTOR THAT MOVES A CAMERA LENS IN A PANNING OR TILTING MOTION

(75) Inventors: Shao-Tsu Kung, Taipei (TW); Po-An Lin, Taipei (TW); Wen-Yi Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 392 days.

(21) Appl. No.: 11/902,643

(22) Filed: Sep. 25, 2007

(65) Prior Publication Data

US 2008/0079847 A1 Apr. 3, 2008

(30) Foreign Application Priority Data

Sep. 28, 2006 (TW) ............... 95135990 A

(51) Int. Cl.
 *H04N 5/225* (2006.01)
(52) U.S. Cl. .................. 348/374; 348/151; 348/143
(58) Field of Classification Search ............... 348/374, 348/151, 143
 See application file for complete search history.

(56) References Cited

U.S. PATENT DOCUMENTS

| 3,732,368 | A | * | 5/1973 | Mahlab | ............ | 348/151 |
|---|---|---|---|---|---|---|
| 4,225,881 | A | * | 9/1980 | Tovi | ............ | 348/151 |
| 4,736,218 | A | * | 4/1988 | Kutman | ............ | 396/427 |
| 6,268,882 | B1 | * | 7/2001 | Elberbaum | ............ | 348/151 |
| 6,532,345 | B1 | * | 3/2003 | Gluck | ............ | 396/427 |
| 6,628,338 | B1 | * | 9/2003 | Elberbaum et al. | ............ | 348/373 |
| 6,715,940 | B2 | * | 4/2004 | Top et al. | ............ | 396/427 |
| 2001/0017665 | A1 | * | 8/2001 | Ackermann et al. | ............ | 348/374 |
| 2002/0085844 | A1 | * | 7/2002 | Tashiro et al. | ............ | 396/427 |
| 2005/0018074 | A1 | * | 1/2005 | Nakamoto et al. | ............ | 348/375 |

* cited by examiner

*Primary Examiner*—Jason Chan
*Assistant Examiner*—Cynthia Calderon
(74) *Attorney, Agent, or Firm*—Bacon & Thomas, PLLC

(57) ABSTRACT

A rotatable camera has a lens unit comprising a photographing head and an oblique driving shaft arranged in oblique position with the photographing head, a bearing support for pivotally mounting the photographing head inside, a motor and a driving gear set driven by the motor to in turn drive the oblique driving shaft to generate rotating motion, when the oblique shaft is in rotating motion, the photographing head of the lens unit immediately rotates and changes the angle of photographing so that the rotatable camera employs only a single motor to drive the photographing head of the lens unit to rapidly move to the direction to be monitored, particularly, due to no time delay any corners shall be monitored by the rotatable camera.

3 Claims, 4 Drawing Sheets

ROTATABLE CAMERA CONTROLLED BY A SINGLE MOTOR THAT MOVES A CAMERA LENS IN A PANNING OR TILTING MOTION

BACKGROUND OF THE INVENTION

1. Field of the Invention

The invention relates to a rotatable camera, particularly to a ball shaped camera equipped with only one motor for varying the angle of camera lens.

2. Description of the Related Art

In the current technology for designing a known ball shaped camera, two driving motors are commonly employed to make the camera lens able to move universally 360 degree. In the motorized mechanism of the ball shaped camera, one of the motors is for controlling the panning of the camera lens in horizontal direction while the other motor is for controlling the tilting of the camera lens in vertical direction so that the camera lens can move both in panning and tilting manner.

However, this type of ball shaped camera has the drawback that the panning and tilting of camera lens driven by two motors separately always causes the lens unable to reach the desired direction rapidly and precisely.

During scanning for monitoring, time delay is always resulted in the ball shaped camera unable to move the lens in time to the direction to be monitored that causes deficiency of monitoring and some corners neglected to be monitored.

SUMMARY OF THE INVENTION

Owing to the above, the major purpose of the invention is to provide a camera with rotatable lens which employs only a single motor to drive the camera lens and move the lens rapidly to the direction to be monitored, and therefore will not cause any corner neglected to be monitored due to time delay.

The structure of the camera of the invention comprises a housing and a base seat pivotally connected to the housing, the housing has a lens unit, a bearing support, a motor and a driving gear set installed inside, wherein the lens unit comprises a photographing head pivotally installed inside the bearing support and an oblique driving shaft driven by the driving gear set which in turn is driven by the motor. Since the oblique driving shaft is rigidly joined to the lens unit, any rotating movement of the oblique driving shaft can immediately cause change of angular position of the photographing head of the lens unit, i.e. by employing just only a single motor the angular position of the photographing head of the lens unit may be varied.

DETAILED DESCRIPTION OF THE PREFERRED EMBODIMENT

Figure 1:
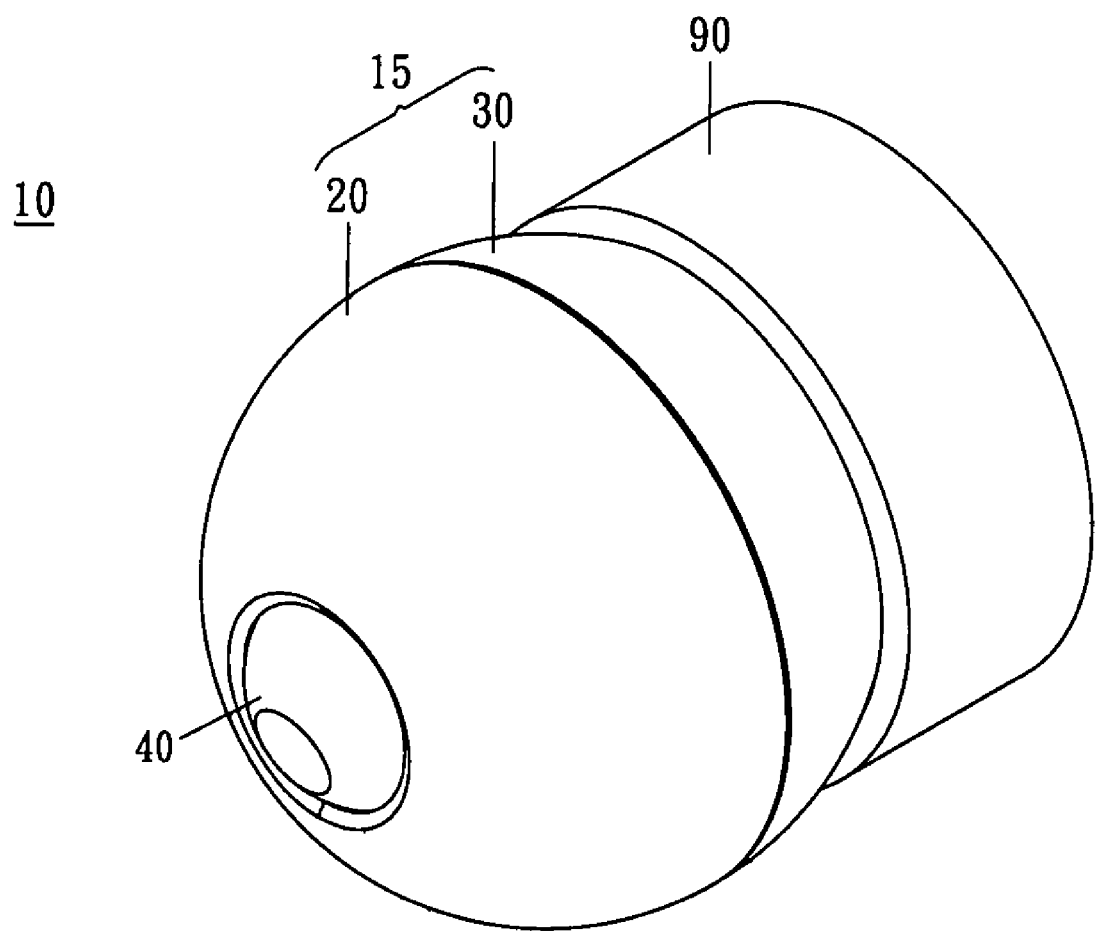
FIG. 1 is the schematic drawing of a rotatable camera of the invention.
Figure 2:
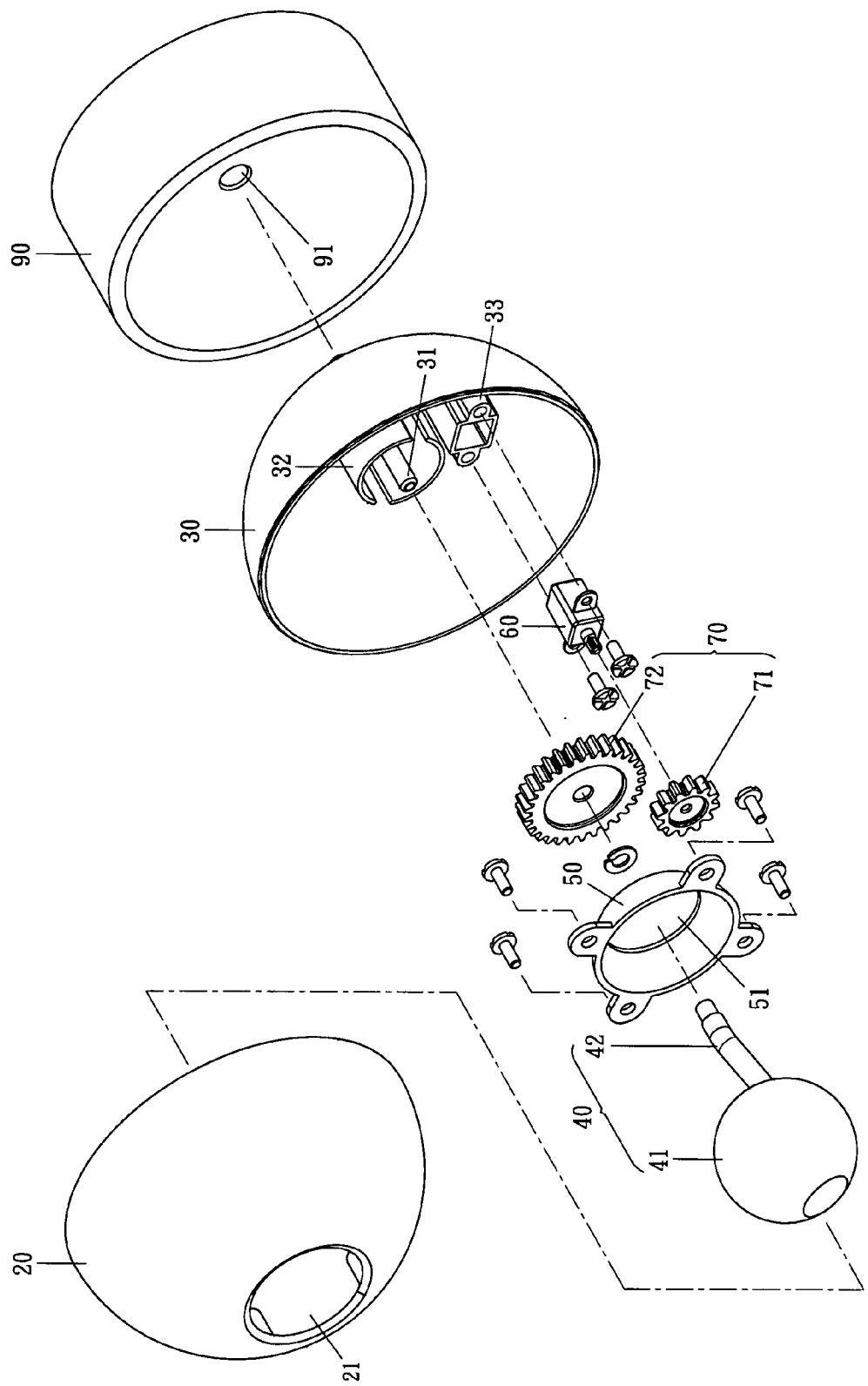
FIG. 2 is the parts disassembly drawing of the rotatable camera shown in FIG. 1.
Figure 3:
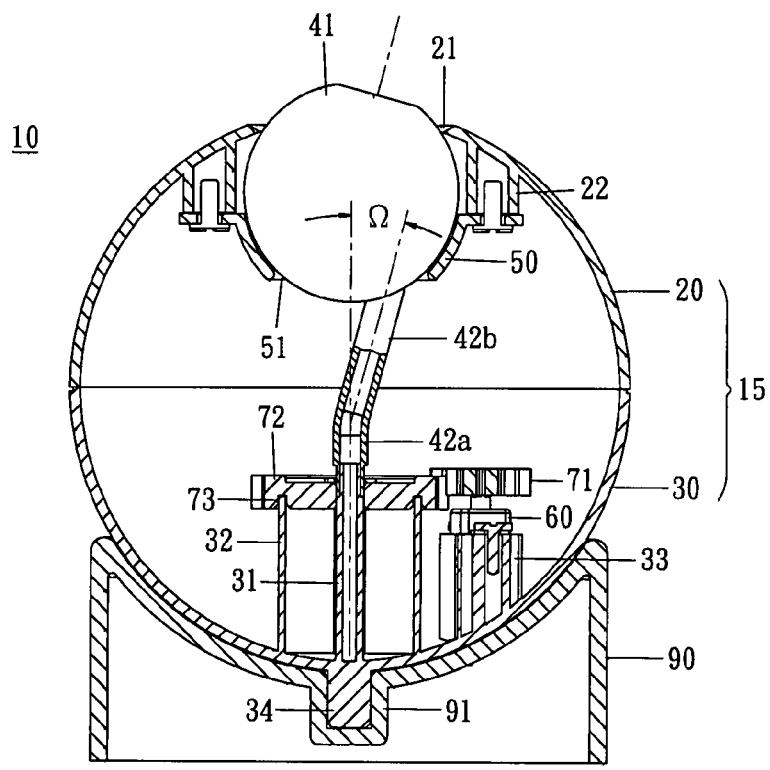
FIG. 3 is a sectional view to show the mechanism inside the rotatable camera shown in FIG. 1.

As illustrated in from FIG. 1 to FIG. 3, the camera 10 of the invention comprises a housing 15, a base seat 90 pivotally installed to the housing 15 and a lens unit 40 installed inside the housing 15.

The housing 15 comprises an upper case 20 and a lower case 30, and in addition to the lens unit 40 the housing 15 also has a bearing support 50, a motor 60 and a driving gear set 70. When the motor 60 is running, the power driven by the motor 60 can be transmitted through the driving gear set 70 to the lens unit 40 to generate angular movement.

Figure 5:
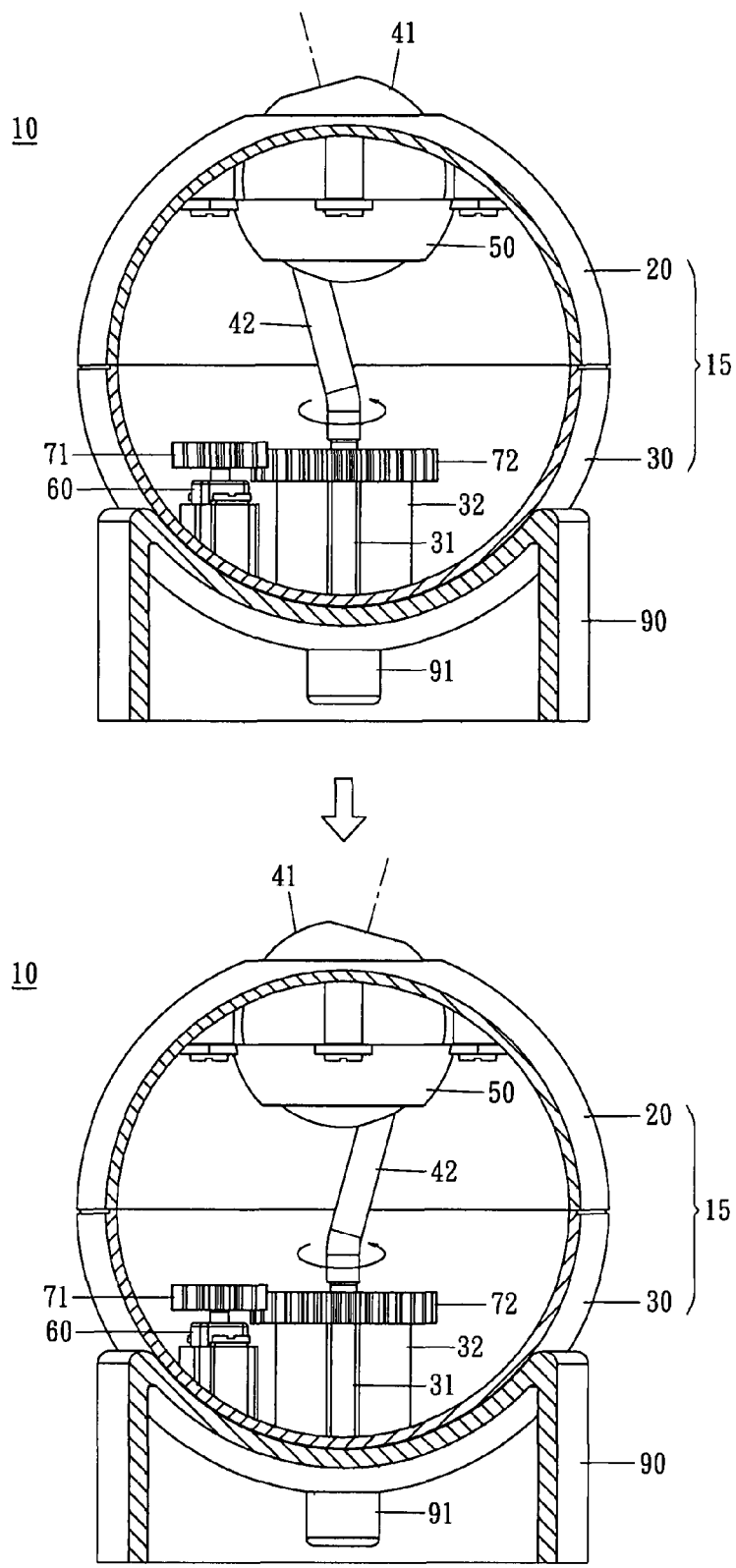
FIG. 5 is an illustration drawing to show the angular movement of the lens unit of the rotatable camera shown in FIG. 1 by employing a single motor.

The lens unit 40 comprises a photographing head 41 and an oblique driving shaft 42 joined to the ball shaped photographing head 41. The oblique driving shaft 42 is a bended shaft comprising a center shaft 42a and an eccentric shaft 42b, and the center shaft 42a is joined to and intersects with the eccentric shaft 42b with an intersection angle Ω, the center line of the center shaft 42a passes through the center of the ball shaped photographing head 41, and the eccentric shaft 42b is joined to the photographing head 41 with an inclination angle Ω. Also as shown in FIGS. 3 and 5, since the direction of the lens for shooting picture by the photographing head 41 is parallel to the center line of the eccentric shaft 42b of the oblique driving shaft 42, when the photographing head 41 of the lens unit 40 is rotating about the center shaft 42a of the oblique driving shaft 42, the lens of the photographing head 41 for shooting picture will also rotate about the same center line that will change the angle of photographing.

The upper case 20 is a half sphere shaped part having an opening 21 and a number of fixing stud 22 for installing the bearing support 50.

The bearing support 50 applied for pivotally mounting the lens unit 40 inside the housing 15 has a spherical bearing 51 with the surface curvature matching the curvature of the photographing head 41 and an opening 52 for mounting the lens unit 40 and providing space for the oblique driving shaft 42 to pass through. Therefore, the photographing head 41 is mounted in the spherical bearing 51 of the bearing support 50.

As illustrated in FIG. 3, by employing the bearing support 50 and the fixing stud 22, the lens unit 40 is pivotally installed inside the bearing support 50 and the upper case 20, and the photographing 41 of the lens unit 40 can shoot pictures through the opening 21 of the upper case 20.

The lower case 30 is also a half sphere shaped part for forming the aforesaid housing 15 with the upper case 20, while inside of the lower case 30 has a main shaft 31, a cylindrical rib 32 and a mounting seat 33. The center line of the cylindrical rib 32 coincides with the center line of the main shaft 31, and a tenon piece 34 is formed on the rear side of the lower case 30.

Shown in FIGS. 2 and 3, the base seat 90 has a spherical inner surface with a curvature same as the curvature of the lower case 30, and a mortise 91 for being connected to the tenon piece 34 so that the lower case 30 can be pivotally installed on the base seat 90.

Figure 4:
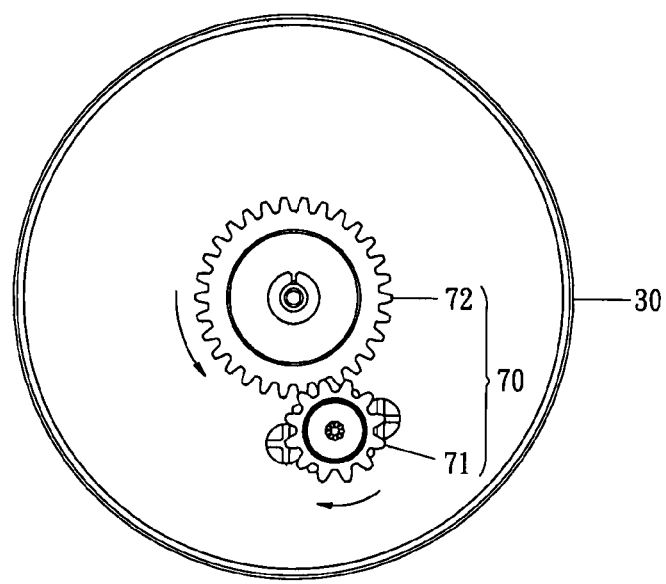
FIG. 4 is a plane view to show the driving gear system of the rotatable camera shown in FIG. 1.

Also shown in from FIG. 2 to FIG. 4, the driving gear set 70 installed inside the lower case 30 comprises a driving gear 71 and a driven gear 72. The driven gear 72 is mounted on the main shaft 31 of the lower case 30, or the driven gear 72 has a ring groove 73 formed on the bottom side. When the driven gear 72 is pivotally mounted on the main shaft 31 of the lower case 30, the ring groove 73 will engage the cylindrical rib 32 of the lower case 30 that can enable the ring groove 73 of the driven gear 72 and the cylindrical rib 32 of the lower case 30 to form a set of sliding mechanism and to have the driven gear 72 rotated firmly and smoothly.

As depicted in FIGS. 3 and 5, the lens unit 40 pivotally installed on the upper case 20 can rotate about the center shaft 42a of the oblique driving shaft 42, and is joined to the center of the driven gear 72, so that the lens unit 40 can be driven to generate rotating motion when the driven gear 72 is driven by the driving gear 71.

The motor 60 is installed on the mounting seat 33 of the lower case 30, and the driving gear 71 mounted on the shaft of the motor 60 engages the driven gear 72.

Therefore, with the mechanism shown in FIGS. 3 and 5, the camera 10 of the invention can control the lens unit 40 to change the angular position and angle of photographing by employing only a single motor 60. When the motor 60 is running, the driving gear 71 will drive the driven gear 72 to generate rotating motion which will move the photographing head 41 of the lens unit 40 to rotate about the center shaft 42a of the oblique driving shaft 42 with an inclination angle Ω between the center line of the eccentric shaft 42b and the center line of the main shaft 31, and the lens of the photographing head 41 will change the angle of photographing following the rotation of the photographing head 41.

As concluded above since the camera 10 of the invention employs only a single motor 60 it can rapidly and precisely move the photographing head 41 of the lens unit 40 to the desired direction of monitoring that can avoid causing time delay during monitoring, and increase monitoring efficiency.

What is claimed is:

1. A rotatable camera, comprising a housing and a base seat pivotally connected to the housing, wherein the housing has a lens unit, a bearing support, a motor and a driving gear set, and wherein the lens unit comprises a ball shaped photographing head and an oblique driving shaft formed by a center shaft and an eccentric shaft, and the eccentric shaft is joined to and intersects with the center shaft in an inclination angle, and the eccentric shaft is joined to the photographing head with the center line of the center shaft passing through the center of the photographing head;

the bearing support has a spherical bearing and an opening for providing space for the oblique driving shaft of the lens unit to pass through, and the photographing head of the lens unit is pivotally installed inside the spherical bearing; and the motor drives the driving gear set to rotate, and in turn to drive the center shaft and the eccentric shaft of the oblique driving shaft of the lens unit to generate rotating motion and further through the eccentric shaft being rotated in rotating motion to have the photographing head of the lens unit moved in a panning and tilting motion.

2. The rotatable camera as described in claim 1, wherein the housing has a main shaft inside, and the driving gear set has a driving gear mounted on the shaft of the motor and a driven gear is mounted on the main shaft and engages the driving gear, and wherein the center shaft of the lens unit is joined to the shaft of the driven gear.

3. The rotatable camera as described in claim 2, wherein the housing further has a cylindrical rib inside, and the driven gear of the driving gear set has a ring groove on the bottom side, and wherein the center line of the cylindrical rib coincides with the center line of the main shaft and the cylindrical rib engages the ring groove on the driven gear.

* * * * *